United States Patent
Björkman et al.

[11] Patent Number: 5,959,988
[45] Date of Patent: Sep. 28, 1999

[54] TELECOMMUNICATIONS SWITCH INCLUDING AN INTEGRATED INTERNET ACCESS SERVER

[75] Inventors: Jan Björkman; Anders Nyman, both of Hägersten; Ingvar Bergström, Tumba, all of Sweden; Björn Melén, Espoo, Finland

[73] Assignee: Ericsson, Inc., Research Triangle Park, N.C.

[21] Appl. No.: 08/879,947

[22] Filed: Jun. 20, 1997

Related U.S. Application Data

[60] Provisional application No. 60/020,059, Jun. 24, 1996.

[51] Int. Cl.$^6$ .................................................. H04L 12/66
[52] U.S. Cl. ........................ 370/389; 370/466; 370/375
[58] Field of Search ................................. 370/352, 354, 370/401, 402, 465, 466, 422, 423, 425, 375, 377, 434, 445; 379/87; 375/222

[56] References Cited

U.S. PATENT DOCUMENTS

| | | | |
|---|---|---|---|
| 5,630,061 | 5/1997 | Richter | 370/352 |
| 5,668,857 | 9/1997 | McHale | 379/93.07 |
| 5,689,550 | 11/1997 | Garson | 379/89 |
| 5,689,644 | 11/1997 | Chou | 370/352 |

FOREIGN PATENT DOCUMENTS

| | | | |
|---|---|---|---|
| 0312628 | 4/1989 | European Pat. Off. | H04L 11/20 |
| 0664658 | 7/1995 | European Pat. Off. | H04Q 11/04 |
| 61-030148 | 2/1986 | Japan | H04L 11/20 |
| 06245243 | 9/1994 | Japan | H04Q 3/58 |
| 08265884 | 10/1996 | Japan | H04Q 11/04 |

*Primary Examiner*—Chau Nguyen
*Assistant Examiner*—Thinh Vu
*Attorney, Agent, or Firm*—Jenkens & Gilchrist, P.C.

[57] ABSTRACT

A telecommunications switch is provided with an internal ethernet link which is connected to a group switch/time switch portion of the switch through a number of interface processors. The group switch/time switch portion functions to switch data communications among and between the subscriber lines, trunk lines and the interface processors. The ethernet link serves as a concentrator for packet data communications carried over the subscriber/trunk lines and handled by switch. The interface processors operate to selectively insert and extract packet data communications to and from the ethernet link. A connection is made via the ethernet link to an Internet access point to allow concentrated data packet communication with the Internet.

21 Claims, 3 Drawing Sheets

FIG. 6

TELECOMMUNICATIONS SWITCH INCLUDING AN INTEGRATED INTERNET ACCESS SERVER

CROSS-REFERENCE TO RELATED APPLICATION

This Application for Patent claims priority from, and incorporates by reference the disclosure of, co-pending U.S. Provisional Application for Patent Ser. No. 60/020,059, filed Jun. 24, 1996.

BACKGROUND OF THE INVENTION

1. Technical Field of the Invention

This disclosure relates to telecommunications switches and, in particular, to the use of a telecommunications switch to provide Internet communications access and services.

2. Description of Related Art

There is a tremendous amount of interest these days in acquiring access to both the Internet and Internet related services. The most common mechanism used by persons to access the Internet is to contract with an Internet service provider through whom a communications connection to the Internet is obtained. Typically this connection is accomplished through the use of the existing public switched telephone network (PSTN). The person desiring Internet access, and who also subscribes to an Internet service provider, simply uses his or her computer (with a modem, if necessary) to call the Internet service provider, with that call then being routed through the public switched telephone network and the communications functionality of the service provider to an Internet access point (edge router).

It is well known, however, that data communications in general, and Internet type communications in particular, are wasteful of the limited communications resources of the telecommunications network. This is because the public switched telephone network comprises a circuit switched network, and thus each telecommunications connection between a person and their Internet service provider requires a separate physical communications link. Furthermore, this reserved connection must be maintained throughout the length of the call even though the data comprising the carried communication passes over the link on an infrequent basis. In fact, tens of seconds, if not minutes, may pass between subsequent data communications over the reserved circuit switched connection. This is because minor amounts of time are needed to convey the data, while relatively substantial amounts of time are expended in on-line human review of the conveyed information. It would be preferred if the telecommunications connections over the public switched telephone network carrying data communications could be more efficiently utilized. Such improved efficiency has application not only in providing users with telecommunications connections to their respective Internet service providers, but also in facilitating data communications between persons over the public switched telephone network itself.

SUMMARY OF THE INVENTION

Concentration of packet data communications handled by a telecommunications switch is effectuated by routing the packet data communications received from multiple sources (such as subscriber lines or trunk connections) onto a switch supported ethernet link. From the ethernet link, a direct connection may be made to an Internet access point edge router to support Internet access. Alternatively, the ethernet link concentrated data communications may be extracted back through the switch for communication over any number of different links (such as subscriber lines or trunk connections) to support inter-subscriber data communications.

In particular, data communications are routed through a group switch/time switch portion of the telecommunications switch between subscriber lines (such as plain old telephone service (POTS) lines, or integrated services digital network (ISDN) lines) and a first plurality of regional processors. These first regional processors function to insert and extract subscriber data communications to and from the ethernet link. Similarly, data communications are routed through the group switch/time switch portion between trunk connections and a second plurality of regional processors. These second regional processors also function to insert and extract subscriber data communications to and from the ethernet link. The first and second regional processors perform any protocol conversions necessary for the data communications to be concentrated onto and carried by the ethernet link.

A direct connection for the data communications is provided via the ethernet link to the Internet through an Internet access point edge router. This allows data communications to be efficiently routed to the Internet with minimal wasting of valuable communications resources (such as trunk connections). The routing of subscriber data communications through the ethernet link further supports concentrated data communication over the trunk connections also with minimal wasting of valuable communications resources (such as individual subscriber circuit connections).

BRIEF DESCRIPTION OF THE DRAWINGS

A more complete understanding of the present invention may be obtained by reference to the following Detailed Description when taken in conjunction with the accompanying Drawings wherein.

DETAILED DESCRIPTION OF THE DRAWINGS

Figure 1:
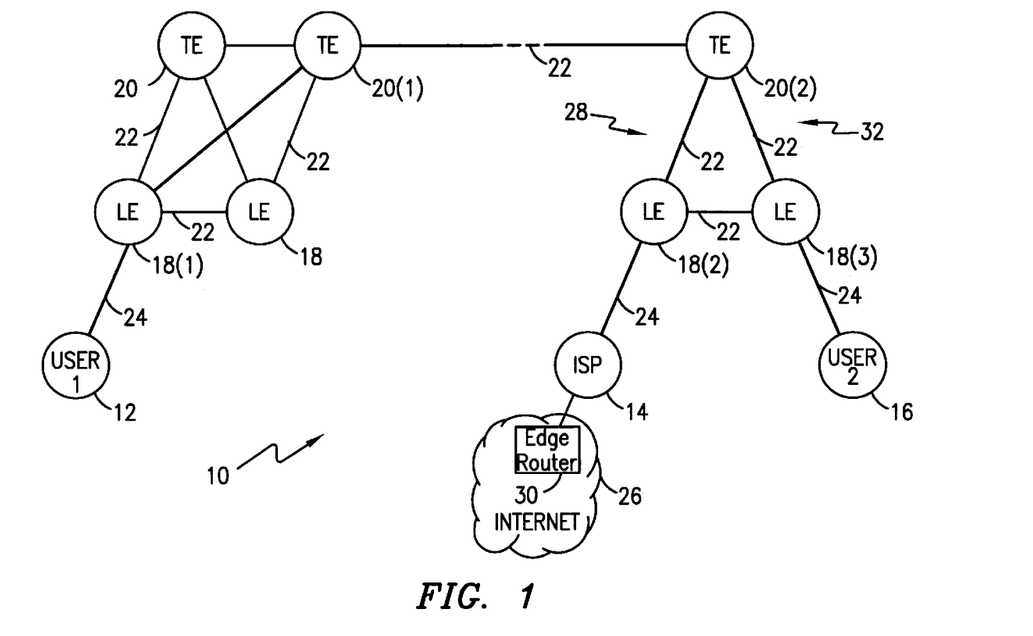
FIG. 1 is a block diagram of a public switched telephone network.

Reference is now made to FIG. 1 wherein there is shown a block diagram of a public switched telephone network (PSTN) 10 providing a data communications connection between a first user 12 and their Internet service provider 14, and between the first user and a second user 16. The public switched telephone network comprises a plurality of local exchanges (LE's) 18 and a plurality of transit exchanges (TE's) 20. The local exchanges 18 and transit exchanges 20 are interconnected with each other by trunk lines 22. The trunk lines 22 also provide interconnections between the local exchanges 18 themselves, and between the transit exchanges 20 themselves. Each local exchange 18 is also connected to a plurality of subscribers via subscriber lines 24. Although only three subscribers comprising the users 12 and 16 and the Internet service provider (ISP) 14 are shown, it will be understood that many more subscriber connections are supported at each local exchange 18.

Suppose the first user (U1) 12 desires to access the Internet 26. A call is placed by the first user 12 to the telephone number of the Internet service provider 14. The call connection 28 (illustrated in bold) established by the public switched telephone network 10 passes through at least the local exchanges 18(1) and 18(2) and perhaps one or more of the other local exchanges 18 as well as perhaps one or more of the transit exchanges 20 (like exchange 20(1)). Once established, the Internet service provider 14 through connects the call to an access point (comprising an edge router) 30 of the Internet 26.

A similar connection 32 (also illustrated in bold) for data communication is established when the first user 12 and second user (U2) 16 desire to engage in a data communications over the public switched telephone network 10. A call is placed from one of the users to the other. The established connection 32 passes through at least the local exchanges 18(1) and 18(3) and perhaps one or more of the other local exchanges 18 as well as perhaps one or more of the transit exchanges 20 (like exchange 20(2)).

Because the public switched telephone network 10 comprises a circuit switched (as opposed to a packet switched) network, the connection 28 is reserved solely to handle the call between the first user 12 and the Internet service provider 14, and the connection 32 is reserved solely to handle the call between the first user 12 and the second user 16. This constitutes a waste of the available communications resources provided by the connections 28 and 32 because those connections must be constantly maintained throughout the respective calls even though the data communications carried thereby occur on only a relatively infrequent basis.

Figure 2:
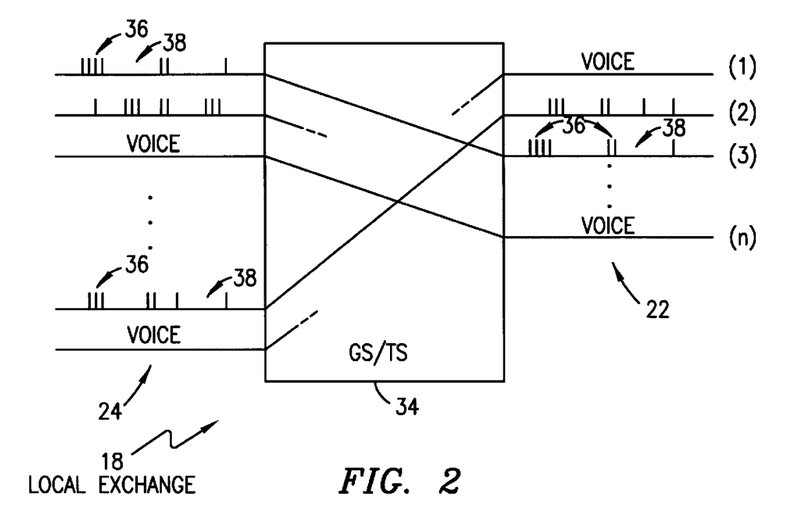
FIG. 2 is a schematic diagram illustrating conventional operation of a local exchange in the handling of a plurality of data communications.

The foregoing may be better understood by reference to FIG. 2 wherein there is shown a schematic diagram illustrating conventional operation of the local exchange 18 in the handling of a plurality of data communications. The local exchange 18 includes a group switch/time switch (GS/TS) 34 which functions to connect any one of the subscriber lines 24 to any one of the trunk lines 22. Thus, if n users connected to the subscriber lines 24 desire to engage in data communications, the switch 34 reserves and makes n corresponding connections to n trunk lines 22. Each user data communication comprises a plurality of data packets 36 (graphically illustrated by tick marks on the communications lines). FIG. 2 illustrates with respect to the user data communications over the subscriber lines 24 and trunk lines 22 that only a small amount of the reserved connect time for each data communication is used in actually transmitting data packets 36. A significant amount of unused (i.e., dead) time 38 between packet 36 transmissions wastefully occurs with respect to each data communication. This resource waste is not so much of a significant problem with respect to use of the subscriber lines 24. It is, however, a significant concern with respect to use of the trunk lines 22 which could instead be used for carrying user voice communications (and perhaps other data communications). There is a need then for concentrating the data communications carried by the trunk lines 22. Such a concentration of the packets 36 would result in a utilization of fewer trunk lines 22 to carry the same amount of user data communications, and would also result in the transmission of those communications with reduced instances of unused time 38.

Figure 3:
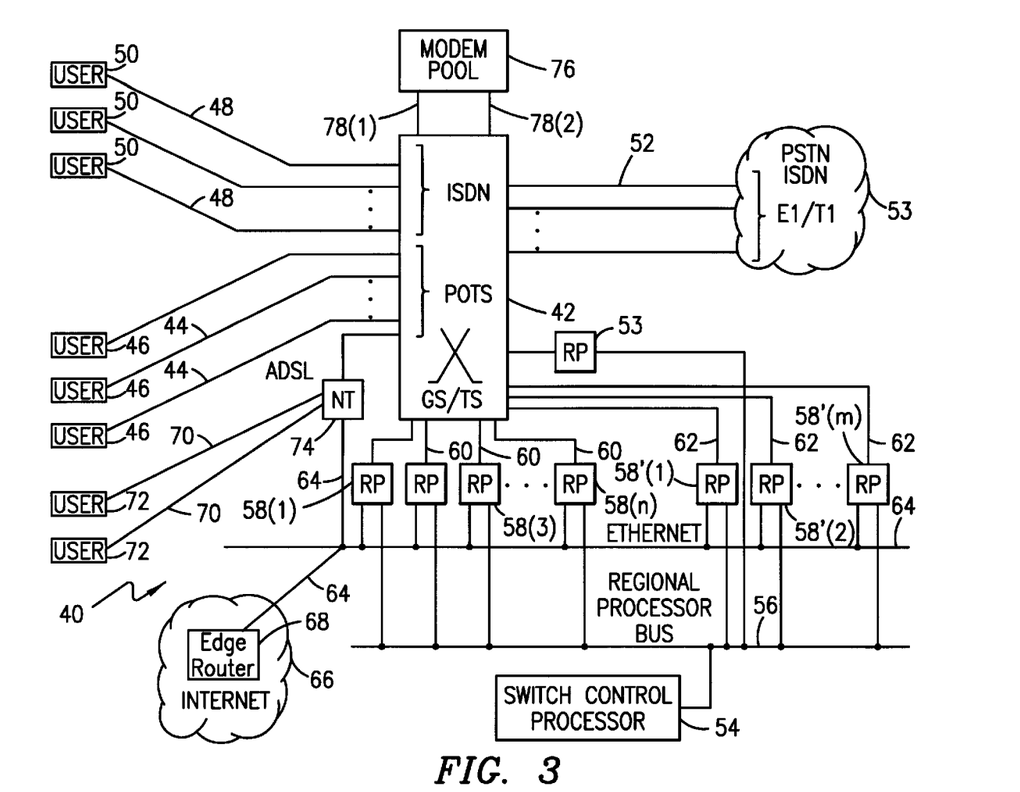
FIG. 3 is a block diagram of a local exchange including an integrated access server functionality of the present invention.

Reference is now made to FIG. 3 wherein there is shown a block diagram of a local exchange 40 including an integrated access server functionality. The local exchange comprises a standard Ericsson AXE-type switch including a group switch/time switch (GS/TS) 42 which is connected to users 46 via a plurality of plain old telephone service (POTS) connection lines 44, as well as connected to users 50 via a plurality of integrated services digital network (ISDN) 2B+D connection lines 48. The group switch/time switch 42 is further connected to a plurality of E1/T1 trunk connections 52 through which a communications interconnection is made to other local exchanges as well as to transit exchanges over the public switched telephone network and/or integrated services digital network (PSTN/ISDN) 53. The group switch/time switch 42 of the local exchange 40 has a configuration and operation well known in the art for selectively interconnecting certain selected ones of the plain old telephone service connection lines 44 and/or integrated services digital network connection lines 48 to certain selected ones of the E1/T1 trunk connections 52. Control over the operation of the group switch/time switch 42 in making the foregoing selected interconnections is effectuated by a regional processor (RP) 53 under the command of a central switch control processor 54. A regional processor control bus 56 carries the signaling between the switch control processor 54 and regional processor 53 necessary to control group switch/time switch 42 operation.

The local exchange 40 further includes a plurality of additional regional processors used in providing the integrated access server functionality. A first plurality of the regional processors 58(1), 58(2), . . . , 58(n) are connected via DL2 interface connections 60 to the group switch/time switch 42, and are connected to the switch control processor 54 via the regional processor control bus 56. Responsive to instructions issued by the switch control processor 54, data communications may be selectively connected (i.e, routed) between any one of the plain old telephone service connection lines 44 and/or integrated services digital network connection lines 48 and the first plurality of the regional processors 58(1), 58(2), . . . , 58(n). A second plurality of the regional processors 58'(1), 58'(2), . . . , 58'(m) are connected via DL2 interface connections 62 to the group switch/time switch 42, and are connected to the switch control processor 54 via the regional processor control bus 56. Similarly, responsive to instructions issued by the switch control processor 54, data communications may be selectively connected (i.e., routed) between any one of the E1/T1 trunk connections 52 and the second plurality of the regional processors 58'(1), 58 (2), . . . , 58'(m). The first plurality of the regional processors 58(1), 58(2), . . . , 58(n) and the second plurality of the regional processors 58'(1), 58'(2), . . . , 58'(m) are interconnected by an Ethernet link 64. Responsive to instructions issued by the switch control processor 54 and transmitted over the regional processor control bus 56, data communications may be selectively inserted into and extracted from the Ethernet link 64 by any of the first and second plurality of regional processors 58 and 58'.

Using the Ethernet link 64, a direct connection is made from the local exchange 40 to the Internet 66 (perhaps through an Internet access point edge router 68). The Ethernet link 64 is further used to make a connection between the local exchange 40 and a plurality of asymmetric data subscriber line (ADSL) connection lines 70 to users 72. A network terminal (NT) 74, providing an ADSL termination, interfaces the plurality of asymmetric data subscriber line connection lines 70 to the Ethernet link 64. The network terminal 74 also interfaces the lines 70 to the group switch/time switch 42 via one or more of the plain old telephone service connection lines 44. As the asymmetric data subscriber line connection lines 70 carry both voice and data (sometimes simultaneously), the network terminal 74 functions to reroute the voice components of a call over the plain old telephone service connection lines 44 to the group switch/time switch 42, and reroute the data components of that call over the Ethernet link 64.

The first plurality of regional processors 58(1), 58(2), . . . , 58(n) function to convert (e.g., format or frame) the actual user data communications between the data communications protocol required for transmission over the plain old telephone service connection lines 44 and/or integrated services digital network connection lines 48 and the data communications protocol required for transmission over the Ethernet link 64. Conversely, the second plurality of the regional processors 58'(1), 58'(2), . . . , 58'(m) function to convert (e.g., format or frame) the actual user data communications between the data communications protocol required for transmission over the Ethernet link 64 and the data communications protocol required for transmission over E1/T1 trunk connections 52. The Ethernet link 64 functions to concentrate the packets of the data communications received from the plain old telephone service connection lines 44, integrated services digital network connection lines 48 and/or asymmetric data subscriber line connection lines 70 for switch 42 routing and transmission over the E1/T1 trunk connections 52. Similarly, the Ethernet link 64 functions to concentrate the packets of the data communications received from the E1/T1 trunk connections 52 for switch 42 routing and transmission over the plain old telephone service connection lines 44, integrated services digital network connection lines 48 and/or asymmetric data subscriber line connection lines 70.

The local exchange 40 still further includes a modem pool 76 implemented on a digital signal processing (DSP) platform and connected via DL2 interface connections 78(1) and 78(2) to the group switch/time switch 42. In particular, the modem pool 76 may be selectively connected by the group switch/time switch 42 (at the instruction of the switch control processor 54) through DL2 interface connection 78(1) to any one of the plain old telephone service connection lines 44. The modem pool 76 processes (e.g., modulates and de-modulates) data communications being transmitted to or received from users 46 over the plain old telephone service connection lines 44. The DL2 interface connection 78(2) and the DL2 interface connections 60 further enable the modem pool 76 to be selectively connected (in response to switch control processor 54 instruction) through the group switch/time switch 42 to the first plurality of regional processors 58(1), 58(2), . . . , 58(n). This provides a route for data packet transmission between the plain old telephone service connection lines 44 and the Ethernet link 64.

Figure 4:
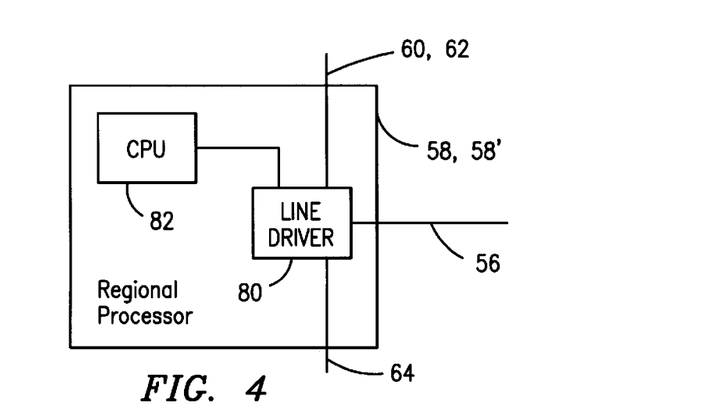
FIG. 4 is a simplified block diagram of the regional processors.

Reference is now made to FIG. 4 wherein there is shown a simplified block diagram of the regional processors 58 and 58'. A media interface line driver 80 provides the interface connections for the DL2 interface connections 60 and 62 to the group switch/time switch 42, the interface connection to the Ethernet link 64, and the interface connection to the regional processor control bus 56. A central processing unit (CPU) 82 controls the operation of the line driver 80 in effectuating data communications between the DL2 interface connections 60 and 62 and the Ethernet link 64. The central processing unit 82 further performs the conversion (e.g., formatting or framing) among and between the various data communications protocols required for transmission over the Ethernet link 64 and the DL2 interface connections 60 and 62 (as required by the plain old telephone service connection lines 44, integrated services digital network connection lines 48 and/or the E1/T1 trunk connections 52). Instructions directing the manner of regional processor 58 or 58' operation are received from the switch control processor 54 by the central processing unit 82 over the control processor bus 56.

Figure 5:
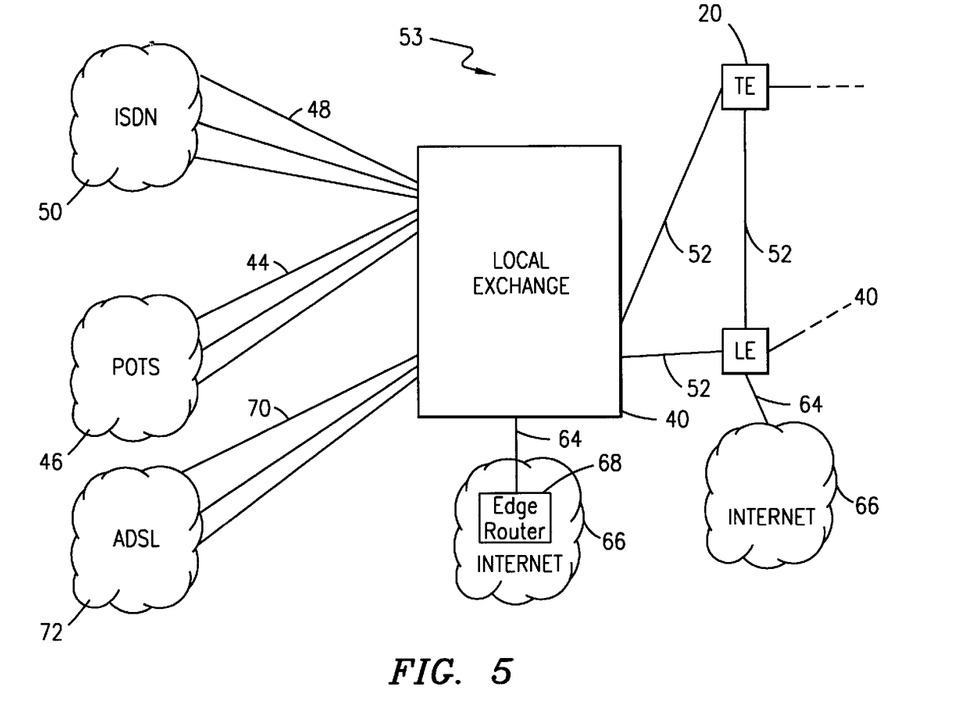
FIG. 5 illustrates the use of the local exchange including an integrated access server functionality.

Reference is now made to FIG. 5 wherein there is shown the use of the local exchange 40 including an integrated access server functionality of FIG. 2 within the public switched telephone network and/or integrated services digital network (PSTN/ISDN) 53. Like the network 10 of FIG. 1, the network 53 includes a plurality of local exchanges (LE's) 40 and a plurality of transit exchanges (TE's) 20. The local exchanges 40 and transit exchanges 20 are interconnected with each other by E1/T1 trunk connections 52. The E1/T1 trunk connections 52 also provide interconnections between the local exchanges 40 themselves, and between the transit exchanges 20 themselves. Each local exchange 40 is connected to a plurality of subscribers through plain old telephone service (POTS) connection lines 44, integrated services digital network (ISDN) connection lines 48, and asymmetric data subscriber line (ADSL) connection lines 70. For the subscribers comprising users 46 connected to the plain old telephone service connection lines 44, it will of course be understood that a modem (not shown) is needed to engage in a data communication. For the subscribers comprising users 50 connected to the integrated services digital network connection lines 48, on the other hand, it will of course be understood that a network terminal (NT—not shown) is needed to engage in a data communication. Furthermore, for the subscribers comprising users 72, it will of course be understood that an ADSL modem (not shown) is needed to engage in a data and/or voice communication. The local exchanges 40 are further connected to the Internet 66 (perhaps through the Internet access point edge router 68) using the Ethernet link 64.

Reference is now made in combination to FIGS. 3 and 5 for a description of the manner of operation of the local exchange 40 including an integrated access server functionality for supporting more efficient data communications. In one mode of operation, the local exchange 40 supports efficient and direct user/subscriber data communications over a private data communications network such as the Internet 66. In another mode of operation, the local exchange 40 supports efficient and direct user/subscriber data communications over a public data communications network such as the public switched telephone network and/or integrated services digital network 53 (concurrent with conventional voice communications). It will, of course, be understood that the local exchange 40 will simultaneously support such user/subscriber data communications over both the private and public networks in both modes of operation if necessary.

With respect to the first mode of operation relating to user/subscriber data communications over a private data communications network such as the Internet 66, take first a data communication between a user 46 connected to one of the plurality of plain old telephone service (POTS) connection lines 44 and the Internet 66. The data communication carried from the user 46 over the plain old telephone service connection line 44 comprises an analog data communication which is routed from the group switch/time switch 42 over the DL2 interface connection 78(1) to the modem pool 76 where it is de-modulated and re-output back over the DL2 interface connection 78(2). The data communication is then routed back through the group switch/time switch 42 and over the DL2 interface connections 60 to the first plurality of regional processors 58(1), 58(2), . . . , 58(n). In the first regional processor 58, the protocol of the data communication is switched (e.g., de-framed) from the protocol required for transmission over the plain old telephone service connection line 44 (for example, point to point protocol (PPP) or serial line Internet protocol (SLIP)) to the protocol required for transmission over the Ethernet link 64 (for example, transmission control protocol/Internet protocol (TCP/IP)). The protocol converted data communication is then output to the Ethernet link 64. The Ethernet link 64 functions to concentrate the data communication with other data communications (from other users 46, as well as users 50 and 72) received from the first regional processors 58 and network terminal 74. The data communication is then sent over the Internet 66 through the Internet access point edge router 68. The first regional processors 58 further perform a routing functionality in directing the data communications towards the proper Internet destinations.

Next, consider a data communication between a user 50 connected to one of the plurality of integrated services digital network (ISDN) 2B+D connection lines 48 and the Internet 66. The data communication carried from the user 50 over the integrated services digital network connection line 48 comprises a digital data communication, thus there is no need to rout the communication through the modem pool 76. Rather, the digital data communication is directly routed from the group switch/time switch 42 over the DL2 interface connections 60 to the first plurality of regional processors 58(1), 58(2), . . . , 58(n). In the first regional processor 58, the protocol of the data communication is switched (e.g., de-framed) from the protocol required for transmission over the integrated services digital network connection line 48 (for example, point to point protocol (PPP) or serial line Internet protocol (SLIP)) to the protocol required for transmission over the Ethernet link 64 (for example, transmission control protocol/Internet protocol (TCP/IP)). The protocol converted data communication is then output to the Ethernet link 64. The Ethernet link 64 functions to concentrate the data communication with other data communications (from other users 50, as well as users 46 and 72) received from the first regional processors 58 and network terminal 74. The data communication is then sent over the Internet 66 through the Internet access point edge router 68. The first regional processors 58 further perform a routing functionality in directing the data communications towards the proper Internet destinations.

Next, consider a data communication between a user 72 connected to one of the plurality of asymmetric data subscriber line (ADSL) connection lines 70 and the Internet 66. The data communication at issue may be carried over the asymmetric data subscriber line connection line 70 along with a voice communication. The network terminal 74 separates the data components from the voice components of the combined communication. The data components are then rerouted to the Ethernet link 64 already the proper protocol (for example, transmission control protocol/ Internet protocol (TCP/IP)). The Ethernet link 64 functions to concentrate the data communication with other data communications (from other users 72, as well as users 46 and 50) received from the first regional processors 58 and network terminal 74. The data communication is then sent over the Internet 66 through the Internet access point edge router 68. The first regional processors 58 further perform a routing functionality in directing the data communications towards the proper Internet destinations.

Reverse processes occur with respect to data communications received from the Internet 66 for group switch/time switch 42 transmission to the users 46, 50 and 72. Thus, the Ethernet link 64 functions to concentrate the data communications received from the Internet 66 and the second regional processors 58'. Furthermore, the first regional processors 58 function to extract the data communications from the Ethernet link 64, and switch (e.g., frame) from the protocol required for transmission over the Ethernet link 64 (for example, transmission control protocol/Internet protocol (TCP/IP)) to the protocol required for transmission over the plain old telephone service connection line 44 and integrated services digital network connection line 48 (for example, point to point protocol (PPP) or serial line Internet protocol (SLIP)). The first regional processors 58 and group switch/time switch 42 further perform a routing function in sending the data communications extracted from the Ethernet link 64 over the proper ones of the plain old telephone service connection lines 44, integrated services digital network connection lines 48, or asymmetric data subscriber line connection lines 70.

With respect to the second mode of operation relating to user/subscriber data communications over a public data communications network such as the public switched telephone network and/or integrated services digital network 53 (concurrent with conventional voice communications), take first a data communication between a user 46 connected to one of the plurality of plain old telephone service (POTS) connection lines 44 and another network user (not shown). The data communication carried from the user 46 over the plain old telephone service connection line 44 comprises an analog data communication which is routed from the group switch/time switch 42 through the DL2 interface connection 78(1) to the modem pool 76 where it is de-modulated and re-output back to the switch over the DL2 interface connection 78(2). The data communication is then routed over the DL2 interface connections 60 to the first plurality of regional processors 58(1), 58(2), . . . , 58(n). In the first regional processor 58, the protocol of the data communication is switched (e.g., de-framed) from the protocol required for transmission over the plain old telephone service connection line 44 (for example, point to point protocol (PPP) or serial line Internet protocol (SLIP)) to the protocol required for transmission over the Ethernet link 64 (for example, transmission control protocol/Internet protocol (TCP/IP)). The protocol converted data communication is then output to the Ethernet link 64. The Ethernet link 64 functions to concentrate the foregoing data communication with other data communications (from other users 46, as well as users 50 and 72) received from the first regional processors 58 and network terminal 74. The data communication is then extracted from the Ethernet link 64 by one of the second plurality of regional processors 58'(1), 58'(2), . . . , 58'(n). In the second regional processor 58', the protocol of the data communication is switched (e.g., framed) from the protocol required for transmission over the Ethernet link 64 (for example, transmission control protocol/Internet protocol (TCP/IP)) to the protocol required for transmission over the E1/T1 trunk connection 52 (for example, point to point protocol (PPP) or serial line Internet protocol (SLIP)). The protocol converted data communication is then output via the DL2 interface connections 62 and switch 42 for transmission over one of the E1/T1 trunk connections 52 to the other user. In this connection, the second regional processors 58' and group switch/time switch 42 further perform a routing function in sending the data communications extracted from the Ethernet link 64 over the proper one of the E1/T1 trunk connection 52 lines.

Next, consider a data communication between a user 50 connected to one of the plurality of integrated services digital network (ISDN) 2B+D connection lines 48 and another user (not shown) over the public switched telephone network and/or integrated services digital network 53 (concurrent with conventional voice communications). The data communication carried from the user 50 over the integrated services digital network connection line 48 comprises a digital data communication, thus there is no need to rout the communication through the modem pool 76. Rather, the digital data communication is directly routed from the group switch/time switch 42 over the DL2 interface connections 60 to the first plurality of regional processors 58(1), 58(2), . . . , 58(n). In the first regional processor 58, the protocol of the data communication is switched (e.g., de-framed) from the protocol required for transmission over the integrated services digital network connection line 48 (for example, point to point protocol (PPP) or serial line Internet protocol (SLIP)) to the protocol required for transmission over the Ethernet link 64 (for example, transmission control protocol/Internet protocol (TCP/IP)). The protocol converted data communication is then output to the Ethernet link 64. The Ethernet link 64 functions to concentrate the foregoing data communication with other data communications (from other users 50, as well as users 46 and 72) received from the first regional processors 58 and network terminal 74. The data communication is then extracted from the Ethernet link 64 by one of the second plurality of regional processors 58'(1), 58'(2), . . . , 58'(n). In the second regional processor 58', the protocol of the data communication is switched (e.g., framed) from the protocol required for transmission over the Ethernet link 64 (for example, transmission control protocol/Internet protocol (TCP/IP)) to the protocol required for transmission over the E1/T1 trunk connection 52 (for example, point to point protocol (PPP) or serial line Internet protocol (SLIP)). The protocol converted data communication is then output via the exchange system bus DL2 interface connections 62 and switch 42 for transmission over one of the E1/T1 trunk connections 52 to the other user. In this connection, the second regional processors 58' and group switch/time switch 42 further perform a routing function in sending the data communications extracted from the Ethernet link 64 over the proper one of the E1/T1 trunk connection 52 lines.

Next, consider a data communication between a user 72 connected to one of the plurality of asymmetric data subscriber line (ADSL) connection lines 70 and another user (not shown) over the public switched telephone network and/or integrated services digital network 53 (concurrent with conventional voice communications). The data communication at issue may be carried over the asymmetric data subscriber line connection line 70 along with a voice communication. The network terminal 74 separates the data components from the voice components. The data components are then rerouted to the Ethernet link 64 already the proper protocol (for example, transmission control protocol/Internet protocol (TCP/IP)). The Ethernet link 64 functions to concentrate the foregoing data communication with other data communications (from other users 72, as well as users 46 and 50) received from the first regional processors 58 and network terminal 74. The data communication is then extracted from the Ethernet link 64 by one of the second plurality of regional processors 58'(1), 58'(2), . . . , 58'(n). In the second regional processor 58', the protocol of the data communication is switched (e.g., framed) from the protocol required for transmission over the Ethernet link 64 (for example, transmission control protocol/Internet protocol (TCP/IP)) to the protocol required for transmission over the E1/T1 trunk connection 52 (for example, point to point protocol (PPP) or serial line Internet protocol (SLIP)). The protocol converted data communication is then output via the exchange system bus DL2 interface connections 62 and switch 42 for transmission over one of the E1/T1 trunk connections 52 to the other user. In this connection, the second regional processors 58' and group switch/time switch 42 further perform a routing function in sending the data communications extracted from the Ethernet link 64 over the proper one of the E1/T1 trunk connection 52 lines.

Reverse processes occur with respect to data communications received over the public switched telephone network and/or integrated services digital network 53 (concurrent with conventional voice communications) for switch 42 transmission to the users 46, 50 and 72. Thus, the Ethernet link 64 functions to concentrate the data communications received from the Internet 66 and the second regional processors 58'. The second regional processors 58' function to switch (e.g., de-frame) from the protocol required for transmission over E1/T1 trunk connection 52 (for example, point to point protocol (PPP) or serial line Internet protocol (SLIP)) to the protocol required for transmission over the Ethernet link 64 (for example, transmission control protocol/Internet protocol (TCP/IP)). Furthermore, the first regional processors 58 function to extract data communications from the Ethernet link 64, and switch (e.g., frame) from the protocol required for transmission over the Ethernet link 64 (for example, transmission control protocol/Internet protocol (TCP/IP)) to the protocol required for transmission over the plain old telephone service connection line 44 and integrated services digital network connection line 48 (for example, point to point protocol (PPP) or serial line Internet protocol (SLIP)). The first regional processors 58 and group switch/time switch 42 further perform a routing function in sending the data communications extracted from the Ethernet link 64 over the proper ones of the plain old telephone service connection lines 44, integrated services digital network connection lines 48, or asymmetric data subscriber line connection lines 70.

Figure 6:
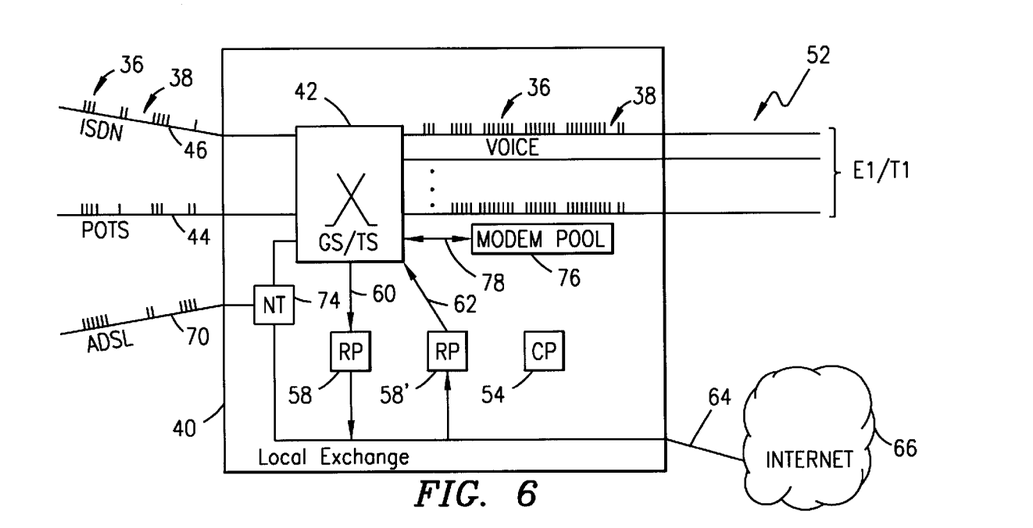
FIG. 6 is a schematic diagram illustrating operation of the local exchange in the handling of a plurality of data communications.

The foregoing concentration of data communications functionality may be better understood by reference to FIG. 6 wherein there is shown a schematic diagram illustrating operation of the local exchange 40 in the handling of a plurality of data communications. Responsive to the transmission of data communications, and under the control of the switch control processor 54, the data packets 36 (graphically illustrated by tick marks on the communications lines) are routed from the switch 42 to the first regional processors 58. For plain old telephone service connection line 44 data transmissions, the data communications are first routed through the modem pool 76. The first regional processors 58 perform any necessary protocol conversions (e.g., de-framing), and then output the data packets 36 to the Ethernet link 64 where they are concentrated with other data packets 36 received from other first regional processors and/or from the network terminal 74. Again under the control of the switch control processor 54, the second regional processors 58' then extract the data packets 36 from the Ethernet link 64 and perform any necessary protocol conversions (e.g., de-framing). The switch 42 then routes the packets onto selected ones of the E1/T1 trunk connections 52. Reverse operations occur with respect to data communications received by the local exchange 40 over the E1/T1 trunk connections 52.

FIG. 6 illustrates, similarly to FIG. 2, that with respect to the user data communications over the subscriber lines 44 and 48 that only a small amount of the reserved connect time for each data communication is used in actually transmitting data packets 36. As discussed above, this is not necessary a significant concern in view of similar waste on the trunk side of the switch. Unlike the operation illustrated in FIG. 2, however, the concentration functionality implemented by the local exchange 40 results in a more efficient use of the E1/T1 trunk connections 52 where fewer individual lines are reserved and less unused (i.e., dead) time 38 between packet 36 transmissions is found.

One advantage provided by the local exchange 40 illustrated in FIGS. 3 and 6 is the consolidation of control and routing provided to the switch operator with respect to both voice and data communications. Thus, the local exchange 40 provides all the functionality needed to serve user data traffic needs. The need for a separate Internet service provider, for example, is obviated. Another advantage provided by the local exchange 40 is robustness of operation resulting from the redundancy of using plural first and second regional processors 58 and 58' within the access server portion. The preferred architecture for this redundancy is the "one plus" concept where a spare first and second regional processor 58 and 58' are available in the event of a processor break-down. Another advantage provided by the local exchange 40 is its ability to concentrate the data traffic, and therefore to not overly bind (i.e., reserve) transport resources in the public switched telephone network and/or integrated services digital network 53 to the data traffic level. Thus, there need not necessarily be maintained a one-to-one mapping of connections between user communications lines 44 or 48 and the E1/T1 trunk connection 52 lines through the switch 42. Another benefit to the operator provided by the local exchange 40 is that the existing charging and billing system in place for handling conventional voice and data calls using reserved circuit connections can also be used to charge (in an integrated bill) for the concentrated data services provided in communicating over the E1/T1 trunk connection 52 lines and for providing users with Internet 66 access via the Ethernet link 64. Thus, users need not necessarily contract with a separate Internet service provider, or have to process a separate Internet service bill, as Internet access is provided directly through the local exchange 40. Alternatively, the operator utilizes the local exchange 40 to concentrate user data traffic for transmission over the E1/T1 trunk connection 52 lines to an Internet service provider who pays the operator for the data concentration services provided by the exchange. Yet another benefit of the incorporation of the access server functionality within the local exchange 40 is the availability of the telecommunications network operation and maintenance system (network) for use in maintaining the functionality of the access server. A further benefit provided by the local exchange 40 is the supporting of both permanent and dial-up (i.e., non-permanent) data communications connections over the E1/T1 trunk connection 52 lines.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A packet data concentrating telecommunications switch, comprising:

a group switch/time switch for selectively interconnecting among and between a plurality of subscriber connection lines, a plurality of trunk connection lines and a plurality of regional processor interface lines;

a plurality of regional processors connected to the group switch/time switch over the corresponding plurality of regional processor interface lines; and a local area network link connected to both the first and second plurality of regional processors;

wherein the plurality of regional processors function to convert packet data communications between a first format used for transmission over the subscriber connection lines and trunk connection lines and a second format used for transmission over the local area network link; and wherein the local area network link functions to concentrate packet data communications received from certain ones of the plurality of regional processors via the group switch/time switch for concentrated output to certain other one or ones of the plurality of regional processors and back through the group switch/time switch.

2. The switch as in claim 1 wherein the plurality of subscriber connection lines comprise plain old telephone service (POTS) lines and integrated service digital network (ISDN) lines.

3. The switch as in claim 1 wherein the plurality of trunk connection lines comprise E1/T1 trunk lines.

4. The switch as in claim 1 wherein the plurality of regional processor interface lines implement a DL2 interface connection.

5. The switch as in claim 1 wherein the local area network link comprises an ethernet link.

6. The switch as in claim 1 wherein the local area network link is connected to an Internet access point to allow concentrated data packet communication between the Internet and the switch to and from the plurality of regional processors.

7. The switch as in claim 1 further comprising:

a modem pool to modulate and demodulate packet data communications received from or sent to the plurality of subscriber connection lines; and modem connection lines connecting the modem pool to the group switch/time switch wherein the group switch functions to interconnect among and between the modem connection lines, the plurality of subscriber connection lines, the plurality of trunk connection lines and the plurality of regional processor interface lines.

8. The switch as in claim 1 further comprising a network terminal providing asymmetric data subscriber line termination and an interface with the local area network link and at least one of the plurality of subscriber connection lines.

9. A method for telecommunications switch operation to concentrate packet data communications, comprising the steps of:

receiving packet communications from a plurality of sources;

switching the received packet data communications from the plurality of sources to a first interface;

concentrating the received and switched packet communications from the first interface onto a local area network link; extracting the concentrated packet data communications from the local area network link to a second interface; and switching the concentrated packet data communications extracted through the second interface to a destination.

10. The method as in claim 9 further including the step of converting by the first interface between a first format of the received packet communications and a second format suitable for the local area network link.

11. The method as in claim 9 further including the step of converting by the second interface between a first format of the packet data communications and a second format suitable for the local area network link.

12. The method as in claim 9 further including the step of transmitting the concentrated packet data communications from the local area network link to an Internet access point to allow concentrated data packet communication between the plurality of sources and the Internet.

13. The method as in claim 9 further including the step of modulating/demodulating the packet communications from the plurality of sources.

14. In a telecommunications switch, comprising:
   a group switch/time switch for selectively interconnecting among and between a plurality of subscriber connection lines, a plurality of trunk connection lines and a plurality of regional processor interface lines;
   a plurality of regional processors connected to the group switch/time switch over the corresponding plurality of regional processor interface lines; and
   a local area network link connected to both the first and second plurality of regional processors;
   a method for operating the telecommunications switch to concentrate packet data communications, comprising the steps of:
      receiving packet data communications from a plurality is of sources over the subscriber connection lines;
      switching the received packet data communications through the group switch/time switch to first ones of the plurality of regional processors; and
      inserting for concentration by the first ones of the plurality of regional processors of the received and switched packet data communications onto the local area network link.

15. The method as in claim 14 further including the step of converting by the first ones of the plurality of regional processors of the packet data communications between a first format used for transmission over the subscriber connection lines and a second format used for transmission over the local area network link.

16. The method as in claim 14 further including the step of transmitting the concentrated packet data communications from the local area network link to an Internet access point to allow concentrated data packet communication transmission from the plurality of sources to the Internet.

17. The method as in claim 16 further including the step of performing reverses of the steps of claims 15 and 16 to allow concentrated data packet communication transmission from the Internet to the plurality of sources.

18. The method as in claim 14 further including the steps of:
   extracting the concentrated packet data communications from the local area network link to at least one of second ones of the plurality of regional processors; and
   switching the extracted concentrated packet data communications through the group switch/time switch onto one of the plurality of trunk connection lines to allow concentrated data packet communication transmission from the plurality of sources to the trunk connection lines.

19. The method as in claim 18 further including the step of converting by the second one of the plurality of regional processors of the packet data communications between a first format used for transmission over the trunk connection lines and a second format used for transmission over the local area network link.

20. The method as in claim 18 further including the step of performing reverses of the steps of claims 18 and 19 to allow concentrated data packet communication transmission from the trunk connection lines to the plurality of sources.

21. The method as in claim 14 wherein the telecommunications switch further comprises a modem pool, and the method further comprises the step of modulating/demodulating packet data communications received from or sent to the plurality of subscriber connection lines.

* * * * *

UNITED STATES PATENT AND TRADEMARK OFFICE
CERTIFICATE OF CORRECTION

PATENT NO. : 5,959,988
DATED : Sep. 28, 1999
INVENTOR(S) : Björkman et al.

It is certified that error appears in the above-identified patent and that said Letters Patent is hereby corrected as shown below:

Column 4, line 47  Replace "58(2)"
With --58'(2)--

Column 13, line 28  Before "of"
Remove --is--

Signed and Sealed this

Sixteenth Day of May, 2000

Attest:

Attesting Officer

Q. TODD DICKINSON

Director of Patents and Trademarks